May 26, 1953 H. L. SCHULTZ 2,640,156

AUTOMATIC FREQUENCY CONTROL APPARATUS

Filed Oct. 31, 1945 2 Sheets-Sheet 1

INVENTOR
HOWARD L. SCHULTZ

BY Ralph L. Chappell
ATTORNEY

May 26, 1953 H. L. SCHULTZ 2,640,156

AUTOMATIC FREQUENCY CONTROL APPARATUS

Filed Oct. 31, 1945 2 Sheets-Sheet 2

INVENTOR
HOWARD L. SCHULTZ

BY Ralph L Chappell
ATTORNEY

Patented May 26, 1953

2,640,156

UNITED STATES PATENT OFFICE 2,640,156

AUTOMATIC FREQUENCY CONTROL APPARATUS

Howard L. Schultz, Wellesley, Mass., assignor, by mesne assignments, to the United States of America as represented by the Secretary of the Navy Application October 31, 1945, Serial No. 625,883

5 Claims. (Cl. 250—36)

My present invention relates in general to automatic frequency control of radio equipment, and in particular to a radio receiver intended for the reception of radio waves of one frequency only, such as for example, a radio beacon receiver.

Since radio beacon transmission is carried on usually at a single frequency, it is desirable that equipment intended for use in such a system transmit on and respond to that single frequency to a high degree of accuracy. Accordingly, such equipment may often be equipped with a circuit for maintaining its frequency substantially constant, usually called an automatic frequency control (A. F. C.) circuit. This need for frequency stabilization of a beacon system becomes greatly important at the higher frequencies. My invention is accordingly illustrated hereinafter as embodied in a radio receiver designed for the reception of energy of such higher frequencies, it being understood, however, that this is only an example of the manner in which the invention can be used.

Briefly, the invention comprises an oscillator of the reflex cavity type in which the frequency is controlled by a negative potential applied to the reflector electrode, and a tuned cavity which is tuned to the frequency at which the oscillator is to be stabilized. An audio signal modulates the oscillator signal and a detector fed by the reference cavity reproduces this audio signal in one of two opposing phases depending upon whether the oscillator signal has a frequency above or below the resonance frequency of the cavity. A single gaseous electron tube in a coincidence circuit controls the potential on the reflector electrode in accordance with the phase of the audio signal produced by the detector.

It is a primary object of my invention to provide automatic frequency control for a radio system which will maintain the frequency of an oscillator substantially constant with the use of a minimum number of electron tubes.

It is another object of my invention to provide a coincidence control circuit that may be constructed of a single electron tube.

Other and further objects and features of my invention will become apparent upon a careful consideration of the following detailed description when taken together with the accompanying drawing, the figures of which illustrate a typical embodiment of the invention.

Figure 1:
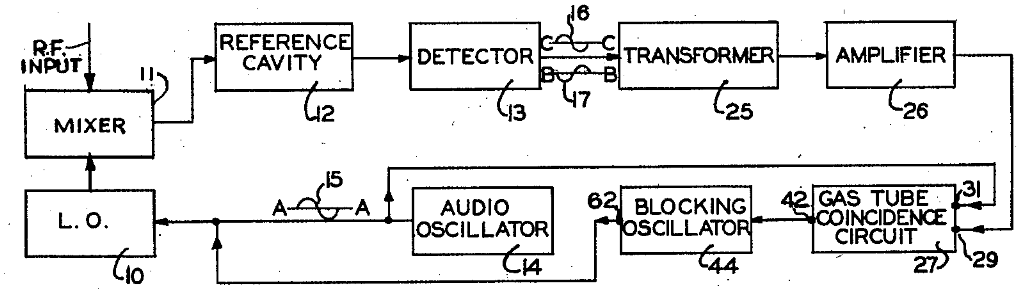
Fig. 1 is a block diagram of an automatic frequency control circuit in accordance with my invention.
Figure 2:
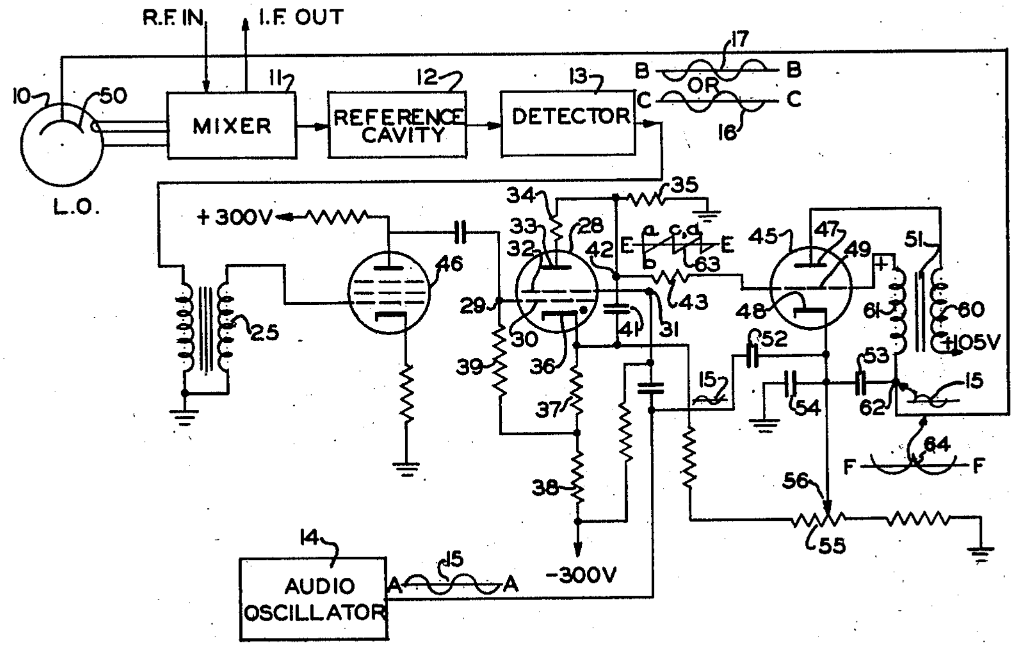
Fig. 2 is a diagram partially in block and partially in electrical scheme of a circuit in accordance with Fig. 1.

In Figs. 1 and 2, a local oscillator 10 energizes a mixer 11 to which conventional R. F. signals may be brought and from which I. F. signals may be taken, which in addition energizes a tuned reference cavity 12 which is fixedly tuned to a predetermined desired local oscillator frequency. A detector 13 rectifies the local oscillator signal in a conventional manner. An audio oscillator 14, which way oscillate at a rate from 800 to 1600 cycles per second, energizes the local oscillator 10 in such a manner as to modulate the local oscillator signal. The detector 13 produces a signal 16 or 17 having the same frequency as the signal 15 from the audio oscillator 14 and the same or the opposite phase respectively, depending upon the frequency of the local oscillator 10 with respect to the resonance frequency of the reference cavity 12, as will now be explained with reference to Fig. 3.

Figure 3:
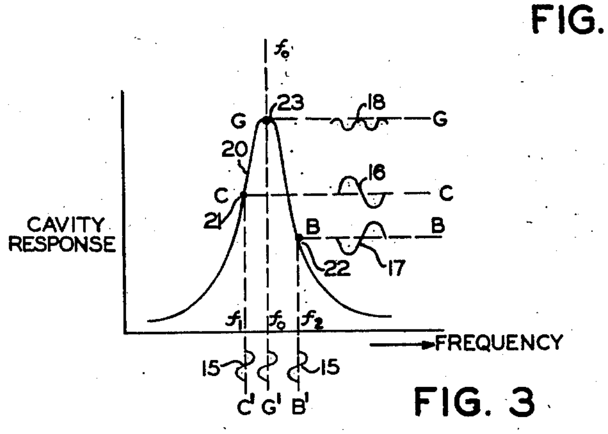
Fig. 3 illustrates the action of the reference cavity and rectifier of Fig. 1.

In Fig. 3, the local oscillator frequency is represented by a dotted line B—B′, C—C′ or G—G′, each of these lines representing a particular operating frequency $f_2$, $f_1$, or $f_0$ respectively of the cavity 12. The resonance frequency is $f_0$, and a frequency above or below that frequency is $f_2$ or $f_1$, respectively. The response curve 20 of the cavity 12 is a conventional tuned cavity response curve. When the local oscillator 10 is oscillating at a frequency $f_1$ below the resonance frequency $f_0$ of the cavity 12, the audio sine wave 15 illustrated on the line C—C′ will be reproduced in like phase in the output of the detector 13 as another audio sine wave 16, line C—C, since the slope of the cavity response curve 20 is positive at the operating point 21 for an operating frequency $f_1$ below the resonance frequency $f_0$. When the operating frequency $f_2$ of the local oscillator 10 is above the resonance frequency $f_0$ of the cavity 12, as illustrated along the line B—B′, the output of the detector 13 is a wave 17 similar to the input sine wave 15, but oppositely phased, as illustrated on the line B—B, the response curve 20 of the cavity 12 now having a negative slope at the operating point 22. In the case where the frequency of the local oscillator 10 is identical with the resonance frequency $f_0$ of the cavity 12, the input sine wave 15 results in a double frequency output sine wave 18, illustrated along the line G—G, the slope of the response curve 20 being alternately positive and negative about the operating point 23. This is a critical condition, however, and in operation one or the other of the two sine waves 16 or 17 is alternately provided by the detector 13.

The detector output signal 16 or 17 is amplified in a transformer 25 and further amplified in an electron tube amplifier 26, comprising an electron tube 46 and suitable associated circuit components. The transformer 25 is used to permit the elimination of an electron tube, and it is to be understood that an ordinary electron tube amplifier may be used in place of this transformer, if desired. The output signal of the amplifier 26, corresponding to the signal 16 or 17 from the detector 13, is fed to a gas tube coincidence circuit 27, comprising preferably a gaseous electron tube 28, at the input terminal 29 thereof, leading to a first grid 30. Simultaneously, a sine wave 15 from the audio oscillator 14 is brought to the coincidence circuit 27 through a second input terminal 31 leading to a second grid 32 of the electron tube 28. The electron tube 28 has its anode 33 grounded through a series pair of resistors 34 and 35. The cathode 36 is connected to a source of negative voltage, which may have a value in the neighborhood of −300 volts, through suitable series resistors 37 and 38. Negative bias is provided for the first grid 30 through a resistor 39 connected at one end to the junction of the last-mentioned resistors 37 and 38. A capacitor 41 is connected from the junction of the resistors 34 and 35 in the anode circuit to the cathode 36. The output 63 from the coincidence circuit 27 is taken at the junction point 42 between the side of the capacitor 41 nearest ground and the resistor 35 nearest ground in the anode circuit. This output 63 of the coincidence circuit 27 is fed through a resistor 43 and a blocking oscillator circuit 44, comprising an electron tube 45 and other components to the reflector electrode 50 of the local oscillator 10 and controls the potential on that electrode 50.

The blocking oscillator 44 comprises the electron tube 45 having an anode 47, a cathode 48, and a grid 49, and a transformer 51 having primary 60 and secondary 61 windings connected in the usual fashion to provide blocking oscillator action, and to a source of positive voltage, which may be in the neighborhood of +105 volts. The output of the blocking oscillator 44 is taken from the grid 49 through the secondary winding 61 at a terminal 62. The audio signal 15 provided by the oscillator 14 is brought through a suitable coupling capacitor 52 to the cathode 48 of the electron tube 45, and then through a second capacitor 53 to the reflector 50 of the local oscillator 10. A potentiometer 55 having a movable arm 56 which is connected to the cathode 48 of the electron tube 45 is inserted in a suitable resistor path between the negative voltage source −300 volts and ground and provides cathode bias for the blocking oscillator electron tube 45. A capacitor 54 is provided between the cathode 48 and ground and is associated in series with the adjacent capacitor 53 and the coincidence circuit output resistor 43 in an integrator network that smoothes the output wave 63 of the coincidence circuit 27 into the final reflector voltage wave 64.

Figures 4, 5:
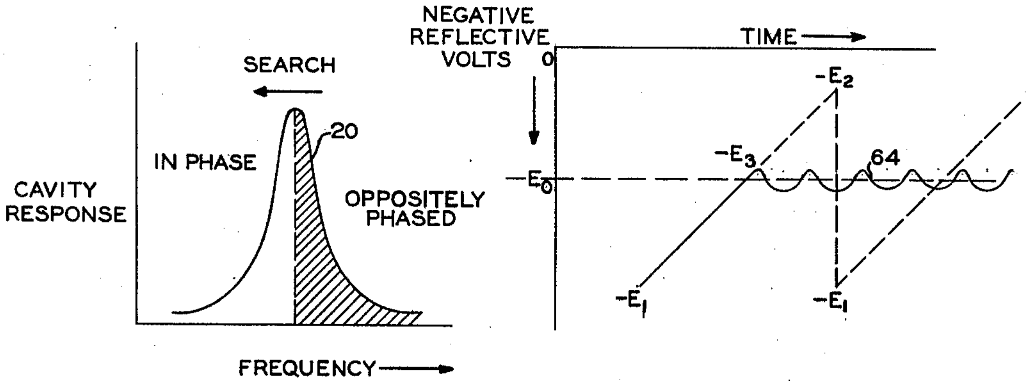
Fig. 4 illustrates the action of the search circuit of Fig. 1 with respect to the reference cavity response.
Fig. 5 illustrates the voltage graph with respect to time of the potential applied to the reflector electrode of the local oscillator of Fig. 1.

The operation of the circuit of Figs. 1 and 2 is as follows. When the circuit is turned on, positive potential is brought to the anode 47 of the blocking oscillator tube 45 through the primary 60 of the transformer 51. The secondary 61 of the transformer 51 is connected at one end to the grid 49 in such fashion as to apply increasingly positive potential to the grid 49 as the conductivity of the electron tube 45 increases in the usual fashion of a blocking oscillator circuit. The opposite end of the secondary 61 is connected to the reflector 50 of the local oscillator 10. Thus the grid voltage wave of the blocking oscillator 44 is available to the reflector electrode 50. When the blocking oscillator 44 has completed one pulse of its oscillation and the tube 45 has ceased to conduct, the voltage of the grid 49 will substantially instantaneously drop to a highly negative value $-E_1$, from which highly negative value it will rise slowly toward ground potential or as illustrated in Fig. 5 toward the value $-E_2$, where a second pulse of oscillation may take place. The grid voltage wave passes through an intermediate or quiescent value $-E_0$, which is the required negative value of reflector electrode potential for maintaining the local oscillator 10 at the desired frequency. This grid voltage wave would gradually rise from the lower negative value $-E_1$ toward the lesser negative value $-E_2$ only if the blocking oscillator 44 were permitted to oscillate freely in its natural fashion, having a somewhat saw-toothed form, as shown in dotted lines after the value $-E_3$. The action of the blocking oscillator 44 is interrupted, however, at a value $-E_3$ slightly less negative than the desired negative value $-E_0$, as will hereinafter be explained.

Figure 6:
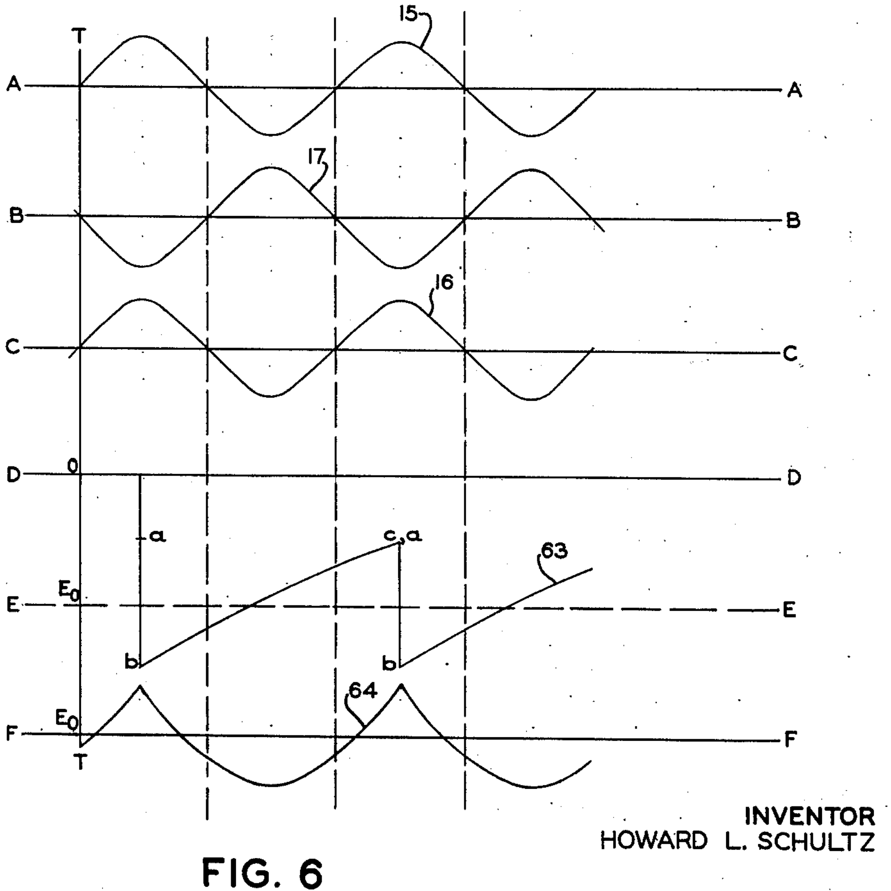
Fig. 6 illustrates phase relationship among various voltage waves existing in the apparatus of Fig. 1.

While the potential on the grid 49 is highly negative, $-E_1$, the local oscillator 10 will be oscillating at a frequency $f_2$ which is higher than the resonance frequency $f_0$ of the cavity 12. As illustrated in Fig. 3 and hereinabove explained, when the local oscillator 10 is oscillating at this higher frequency $f_2$, the output 17 from the detector 13 will be phased oppositely to the sine wave 15. For this reason, the signals on the two grids 30 and 32 of the electron tube 28 in the coincidence circuit 27 will have opposite phases. In Fig. 4, the shaded area under the curve 20 represents the region of such phase opposition. The coincidence circuit 27 is so arranged that the signals on the grids 30 and 32 must be in phase before the electron tube 28 may conduct current, as shown in Fig. 6. As the potential on the reflector electrode 50 rises toward the less negative value $-E_2$, corresponding to a search toward lower frequencies in Fig. 4, the frequency of the local oscillator 10 drops, passing through the peak of the response frequency curve 20 of the cavity 12, and then becoming a frequency $f_1$ less than the resonance frequency $f_0$ at some voltage point $-E_3$. When the voltage on the reflector 50 passes through the quiescent value $-E_0$, the double frequency sine wave output 18 will be had from the detector 13. When the voltage on the reflector 50 passes beyond the quiescent value $-E_0$ to the less negative value $-E_3$, the detector output 16 which is in phase with the audio sine wave 15 is had. This is represented by the unshaded area under the curve 20 in Fig. 4. At this time the signals on the grids 30 and 32 of the electron tube 28 in the coincidence circuit 27 are in phase and the tube 28 begins to conduct current. Since the tube 28 is a gaseous electron tube, conduction will be substantially instantaneous and the impedance provided by the tube 28 in the circuit will substantially vanish. As a consequence, a large current flows in the resistors 34 and 35, and the resistors 37 and 38, due to the presence of the highly negative potential, −300 volts, applied through those resistors and the electron tube 28 to ground. The voltage on the anode 33 then suddenly substantially instantaneously drops from ground potential to a negative value "b" in its output wave 63, shown clearly in Fig. 6. This drop in potential is fed through the resistor 43 to the grid 49 of the blocking oscillator tube 45, thereby interrupting the rise in potential of the grid 49 at the voltage $-E_3$ and lowering the potential on the reflector electrode 50 of the local oscillator 10. This reverses the direction of search in Fig. 4, and the frequency of the local oscillator 10 is increased to the point where it is now greater than the resonance frequency $f_0$ of the reference cavity 12. As a further consequence, the output 17 of the detector 13 is now oppositely phased to the sine wave 15 from the oscillator 14. Thus, the signals on the grids 30 and 32 of the electron tube 28 in the coincidence circuit are now oppositely phased.

The electron tube 28 is substantially self-extinguishing inasmuch as the sudden drop in potential of the anode 33 will cause the tube to cease conducting current. Simultaneously with the drop in potential on the anode 33, the capacitor 41 is charged negatively to the same extent, the side of that capacitor nearest ground taking on this new negative potential. After the electron tube 28 has ceased to conduct current, this capacitor 41 discharges through the thereunto connected resistor 35 to ground. Depending on the value of the resistor 35, this discharge takes a substantial amount of time, and the voltage 63 at the output point 42 rises gradually to a value "c." Since this voltage is ultimately applied to the reflector 50 of the local oscillator 10, eventually lowering its frequency to the value $f_1$ below the resonance frequency $f_0$ of the cavity 12, at this value "c" there is coincidence again between the phases of the signals on the grids 31 and 32 of the coincidence circuit 27. This point "c" thus becomes the point "a" which the electron tube 28 will again begin to conduct and the process will repeat itself. There is thus provided a relatively sawtoothed wave 63, shown along the axis E—E as the output of the coincidence circuit 27, which wave 63 maintains the reflector voltage close to the quiescent value $-E_0$.

This output 63 from the coincidence circuit 27 thus keeps the grid 49 of the blocking oscillator tube 45 from ever again reaching the less negative value $-E_2$ at which the blocking oscillator 44 will again commence normal oscillation. Thus the blocking oscillator circuit 44 is valuable only to start the automatic frequency control circuit into operation, as illustrated in Fig. 5.

The output wave 63 of the coincidence circuit 27 is somewhat sawtoothed, and therefore not sufficiently smooth to be used as an automatic frequency control voltage for the reflector electrode 50. An integrator circuit, comprising the coincidence circuit output resistor 43 and two capacitors 53 and 54 in series to ground, smoothes this wave 63 so that at the output point 62 a wave 64 having a smoother shape is had, which is the control wave applied to the reflector electrode 50. This wave oscillates about the quiescent reflector voltage $-E_0$ at a frequency equal to the frequency of the sine wave output 15 of the audio oscillator 14. It is a substantially smooth wave, however, with small amplitude and maintains the frequency of the local oscillator 10 substantially stable. With proper balancing of the resistor 43 and the capacitors 53 and 54 of the integrator network, the output wave 64 at the point 62 may be made to have a substantially smooth form. The downward portion, "a" to "b," of the output wave 63 of the concidence circuit 27 charges the condensers 53 and 54, in series slowly, providing an initial curved portion to the wave 64, and the gradual upward portion will be augmented by the discharge of the said capacitors 53 and 54, thus providing an oscillatory wave 64 with relatively fewer sharp points.

The potentiometer 55 serves to adjust the voltage limits $-E_1$ and $-E_2$ through which the grid 49 of the blocking oscillator tube 45 would normally tend to swing if permitted to run uninterrupted, and thus determines whether or not the blocking oscillator will be able to function around the critical voltage value $-E_0$ required to cause the local oscillator tube 10 to oscillate at the desired frequency.

As shown in Fig. 6, phase coincidence between the positive peaks of the sine wave 15 and the in-phase detector output wave 16 determines the time of conduction of the coincidence tube 28, and hence of the negative excursion "a" to "b" of the output wave 63 of that tube. This is the preferred adjustment, to assure that the tube 28 will become conductive only at this time.

As will be readily appreciated, although in a receiver the mixer 11 will also have the usual received R. F. signals introduced into it, and the usual detector and I. F. amplifier of a radio receiver energized by its normal output, in other applications of my invention, the mixer 11 may be omitted. It is then apparent that there remains a circuit for maintaining automatic frequency control of any oscillator, as for example, that of a transmitter, or a test standard. Since this and other changes may be made in the above described article and different embodiments of the invention could be made without departing from the scope thereof, it is intended that all matter contained in the description hereinabove or shown in the accompanying drawing shall be interpreted as illustrative and not in a limiting sense, and that the invention is not to be limited except insofar as is necessitated by the prior art and the spirit of the appended claims.

What is claimed is:

1. Automatic frequency control apparatus comprising, an oscillator circuit of the type whose frequency is dependent upon the electric potential applied to an electrode thereof adapted to oscillate substantially at a desired frequency, means for modulating the output of said circuit with a first oscillatory signal, a resonant cavity tuned to said desired frequency having as its input the output of said circuit, a detector having as its input the output of said cavity and as an output an oscillatory reference signal of like frequency to said first oscillatory signal, said reference signal having a first phase similar to that of said first oscillatory signal when the frequency of said oscillator is below the resonance frequency of said cavity and a second opposite phase when said oscillator frequency is above said resonance frequency, means for periodically varying the value of said electric potential between relatively broadly spaced limits including the value required to provide said desired frequency, and a coincidence circuit responsive to phase coincidence between said first and reference oscillatory signals for interrupting the action of said last mentioned means at a time when said electric potential is substantially at said desired frequency value and thereafter maintaining said potential substantially at said desired frequency value.

2. Apparatus in accordance with claim 1 in which said coincidence circuit comprises a gaseous electron tube having at least two grids, an anode, and a cathode, the first of said grids having as its input the output of said detector, the second of said grids being energized by said first signal, said anode being grounded through a first resistor, and said cathode being connected through a second resistor to a source of negative voltage, and a capacitor connected from said anode to said cathode, the side of said capacitor nearest ground being further connected to said electrode of said oscillator.

3. Apparatus in accordance with claim 1 in which said coincidence circuit comprises a normally non-conductive gaseous electron tube having at least two grids, the first of said grids having as its input the output of said detector, the second of said grids being energized by said first signal, said anode being grounded through a first resistor, and said cathode being connected through a second resistor to a source of negative voltage, and a capacitor connected from said anode to said cathode and further connected to said electrode of said oscillator, said normally non-conductive gaseous electron tube becoming conductive when the signals on said two grids are in phase, whereby the anode of said gaseous tube becomes negative with respect to ground and said electrode simultaneously becoming lower in potential.

4. Automatic frequency control apparatus comprising, an oscillator circuit adapted to oscillate substantially at a desired frequency, means for modulating the output of said oscillator circuit with a first signal, a resonant circuit tuned to said desired frequency having as its input the output of said oscillator circuit, a detector having as its input the output of said resonant circuit and as an output a reference signal of like frequency to said first signal, said reference signal having a first phase similar to that of said first signal when the frequency of said oscillator is below the resonant frequency of said tuned circuit and a second opposite phase when said oscillator frequency is above said resonant frequency, means for periodically varying the output frequency of said oscillator between broadly spaced limits including said desired frequency, and a coincidence circuit responsive to phase coincidence between said first and reference signals for interrupting the action of said last-mentioned means when said output frequency is substantially said desired frequency and thereafter maintaining said output frequency at said desired frequency.

5. Automatic frequency control apparatus comprising, a primary oscillator for providing a signal substantially at a desired frequency determined by voltage applied thereto, means for modulating the output of said primary oscillator with a signal of frequency substantially lower than said desired frequency, a cavity resonator fixedly tuned to said desired frequency, means for applying the modulated output of said primary oscillator to said cavity resonator, a detector for demodulating the output of said cavity resonator and providing a signal of a first phase in response to one direction of deviation of the output of said primary oscillator from said desired frequency and a signal of a second phase opposite to said first phase in response to deviation of the output of said primary oscillator from said desired frequency in a direction opposite to said first direction, a gas tube coincidence circuit having two input channels, means for applying the output of said detector to one of said input channels, means for applying a portion of the output of said modulating means to the other of said input channels, said gas tube coincidence circuit becoming conductive only in response to phase coincidence between the signals applied to said two input channels, a blocking oscillator for providing high frequency sweep voltages, which sweep voltages pass through the critical voltage required to maintain said primary oscillator at said desired frequency, means connecting said gas tube coincidence circuit to said blocking oscillator to interrupt said sweep voltages as they reach said critical voltage, and means connecting the output of said blocking oscillator to said primary oscillator as a frequency controlling voltage, the frequency of the output of said primary oscillator determining the times of conduction of said gas tube coincidence circuit and thereby the sweeping action of said blocking oscillator.

HOWARD L. SCHULTZ.

References Cited in the file of this patent

UNITED STATES PATENTS

| Number | Name | Date |
|---|---|---|
| 2,261,800 | Freeman | Nov. 4, 1941 |
| 2,379,689 | Crosby | July 3, 1945 |
| 2,404,568 | Dow | July 23, 1946 |
| 2,406,125 | Ziegler et al. | Aug. 20, 1946 |
| 2,434,294 | Ginzton | Jan. 13, 1948 |
| 2,462,294 | Thompson | Feb. 22, 1949 |
| 2,475,074 | Bradley et al. | July 5, 1949 |
| 2,510,095 | Frankel | June 6, 1950 |